(No Model.)

J. W. FLEMING.
Combined Cultivator and Harrow.

No. 226,656. Patented April 20, 1880.

Witnesses
Nat. E. Oliphant,
Geo. R. Porter.

Inventor
James W. Fleming,
per Chas. H. Fowler,
Attorney.

UNITED STATES PATENT OFFICE.

JAMES W. FLEMING, OF ST. JOSEPH, MISSOURI, ASSIGNOR OF ONE-HALF OF HIS RIGHT TO FLORENCE H. STUMPF, OF SAME PLACE.

COMBINED CULTIVATOR AND HARROW.

SPECIFICATION forming part of Letters Patent No. 226,656, dated April 20, 1880.

Application filed March 6, 1880. (No model.)

*To all whom it may concern:*

Be it known that I, JAMES W. FLEMING, a citizen of the United States, residing at St. Joseph, in the county of Buchanan and State of Missouri, have invented certain new and useful Improvements in Combined Cultivator and Harrow; and I do hereby declare that the following is a full, clear, and exact description of the same, reference being had to the annexed drawings, making a part of this specification, and to the letters and figures of reference marked thereon.

Figure 1:
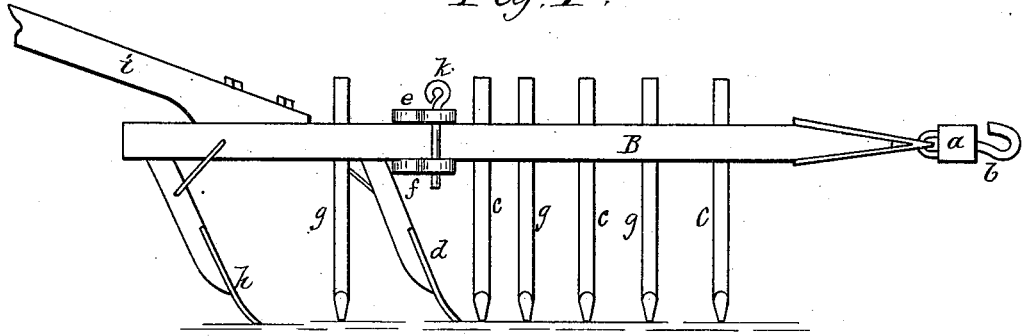
Figure 2:
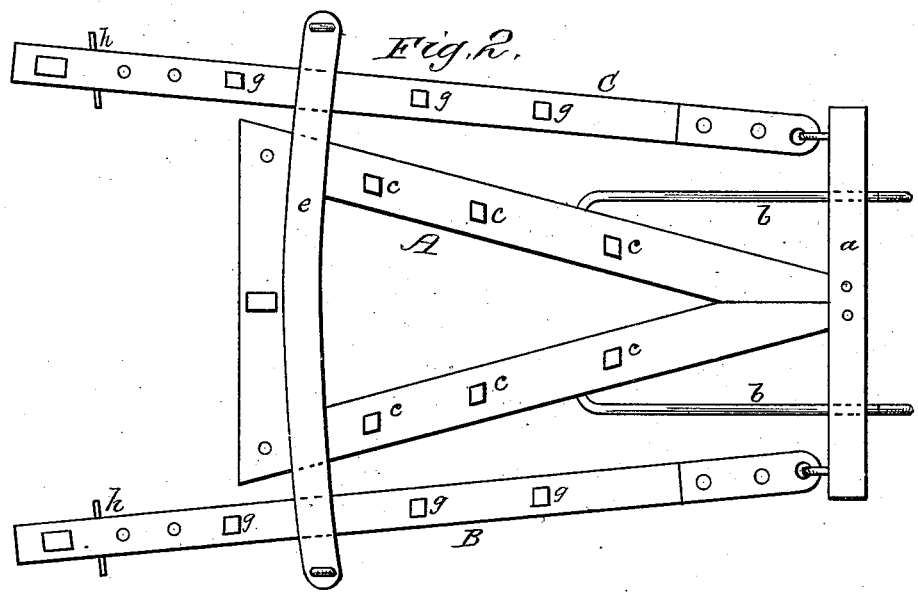
Figure 3:
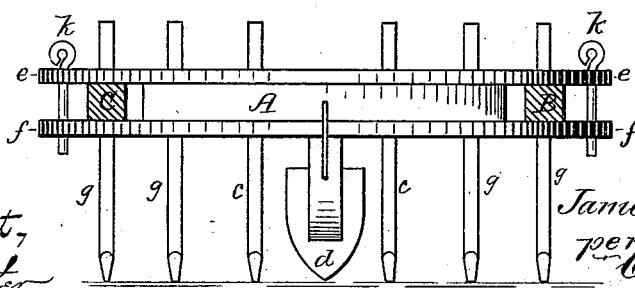

Figure 1 of the drawings is a side elevation of my invention; Fig. 2, a top-plan view of the same, and Fig. 3 an end view, partly in section.

The present invention has relation to combined cultivator and harrow employed for cultivating corn, cotton, &c.; and it consists in constructing the same so that it can be more conveniently and effectively used, and be manufactured at a greatly reduced cost.

The invention consists in the details of construction as illustrated in the drawings, hereinafter described, and subsequently pointed out in the claim.

In the accompanying drawings, A represents a triangular frame rigidly secured at its forward end to a cross-beam, $a$, said frame being braced by rods $b$, connected to the sides thereof and passing through the cross-beam $a$, and are hooked upon their ends for attaching thereto the team.

The frame A is provided with the usual cultivator-teeth $c$ and shovel $d$, and also has secured to it segmental guide-bars $e\ f$ upon the upper and lower sides thereof.

To the cross-beam $a$ are secured the ends of wings B C by eyebolts or any other convenient means, whereby the free ends of the wings are allowed to move to or from the frame A as required.

The wings B C at their free or rear ends pass between the guide-bars $e\ f$, and are not only provided with cultivator-teeth $g$, but shovels $h$ and suitable handles $i$, and are held between the guide-bars $e\ f$ or prevented from being carried beyond the ends of the bars by pins $k$, removably connected to the ends of the bars.

The harrow or cultivator teeth are placed in front of the shovels, so as to tear up the soil and get it in shape for the shovels to throw it up against the corn, &c.

The wings B C are movable, as previously stated, so as to regulate the plow and harrow to suit the width of row or passage between the corn, &c.

The shovel $d$ is intended to make the water-furrow for draining the land and leaving it in good shape in case of rain after plowing.

The plows may be removable and others of different shape substituted, as circumstances may require.

Having now fully described my invention, what I claim as new, and desire to secure by Letters Patent, is—

The triangular-shaped frame A, with teeth $c$ and shovel $d$, and having connected to it cross-beam $a$ and segmental guide-bars $e\ f$, in combination with the wings B C, having teeth $g$ and plows or shovels $h$, said wings being connected to the beam $a$, as described, and for the purpose set forth.

In testimony that I claim the above I have hereunto subscribed my name in the presence of two witnesses.

J. W. FLEMING.

Witnesses:
 J. S. SHARP,
 H. N. CORNELL.